United States Patent [19]

Brown et al.

[11] Patent Number: 5,185,035
[45] Date of Patent: Feb. 9, 1993

[54] TRANSPARENT HOT MELT JET INK

[75] Inventors: Edward A. Brown, Kent; John P. N. Haxell, Bath; Michael A. Cockett, Kent, all of Great Britain

[73] Assignee: Coates Electrographics Limited, United Kingdom

[21] Appl. No.: 737,928

[22] Filed: Jul. 29, 1991

Related U.S. Application Data

[63] Continuation of Ser. No. 528,104, May 23, 1990, abandoned.

[51] Int. Cl.$^5$ .................. C09D 11/12; C09D 11/08; C09D 11/06
[52] U.S. Cl. ................ 106/31 R; 106/30 A; 106/27 R; 106/272; 106/28 A
[58] Field of Search ............ 106/30, 31, 272, 27

[56] References Cited

U.S. PATENT DOCUMENTS

| | | |
|---|---|---|
| 3,653,932 | 4/1972 | Berry et al. |
| 4,108,671 | 8/1978 | Richlin ............... 106/23 |
| 4,390,369 | 6/1983 | Merritt et al. ............... 106/31 |
| 4,484,948 | 11/1984 | Merritt et al. ............... 106/31 |
| 4,659,383 | 4/1987 | Lin et al. ............... 106/27 |
| 4,684,956 | 8/1987 | Ball ............... 106/22 |
| 4,741,930 | 5/1988 | Howard et al. |
| 4,851,045 | 7/1989 | Taniguchi ............... 106/31 |
| 4,931,095 | 6/1990 | Nowak et al. ............... 106/31 |
| 5,006,170 | 4/1991 | Schwartz et al. ............... 106/20 |

FOREIGN PATENT DOCUMENTS 0099682  7/1983  European Pat. Off.
0181198  11/1985  European Pat. Off.

OTHER PUBLICATIONS

The Condensed Chemical Dictionary, Tenth Ed., Revised by Gessner G. Hawley, p. 1094.

Primary Examiner—Mark L. Bell
Assistant Examiner—Helene Klemanski
Attorney, Agent, or Firm—Brumbaugh, Graves, Donohue & Raymond

[57] ABSTRACT

The transparent hot melt jet inks described in the specification include a coloring agent, a vehicle for the coloring agent including a thermoplastic nontransparent base material and a transparentizing agent containing a glycol ester of a $C_{18-35}$ fatty acid, a glyceryl ester of a $C_{18-36}$ fatty acid with metal soaps, a polyethylene wax having a molecular weight of 400 to 1200, a synthetic paraffin wax, or a linear alcohol with a molecular weight of 500 to 1000 or a mixture thereof, a microcrystalline or modified microcrystalline wax.

14 Claims, No Drawings

TRANSPARENT HOT MELT JET INK

This application is a continuation of application Ser. No. 528,104, filed on May 23, 1990, now abandoned.

BACKGROUND OF THE INVENTION

This invention relates to hot melt inks and, more particularly, to a new and improved transparent hot melt ink for use in ink jet systems.

In order to make excellent color reproductions on paper or vivid overhead projection transparencies, it is necessary to use highly transparent colored inks. These are normally supplied in a four-color process set, i.e., cyan, magenta, yellow and black. Conventional color printing often utilizes oil-based inks which normally incorporate a polymeric, film-forming, highly transparent vehicle to carry colorant to the substrate to be printed. Those polymeric vehicles, however, tend not to be suitable for inks used in ink jet systems because they have very high melt viscosities.

Conversely, low melt viscosity, sharp melting waxlike materials such as stearic acid, stearone and laurone, behenic acid, tristearin, terephthal alcohol, hydrogenated castor oil, propylene glycol monohydroxystearate, n-stearyl 12 hydroxystearamide etc., while satisfying the melt viscosity requirements of ink jet systems, form highly crystalline opaque solids on cooling. Similarly, most waxes, such as polyethylene, carnauba, candelilla, microcrystalline, and oxidized or modified polythene waxes, also tend to crystallize on cooling. Because of their crystalline content, such inks, even when mixed with transparent constituents, are not completely transparent and, when jet printed, do not project vivid colors in overhead projection transparencies, for example.

Heretofore, hot melt ink formulations have been proposed which comprise blends of natural waxes (e.g., U.S. Pat. No. 4,484,948), $C_{18}$–$C_{24}$ fatty acids or alcohols (European Published Applications No. 0 181 198 and 0 099 682) or esters didodecyl sebacate (U.S. Pat. No. 3,653,932), and other synthetic blends of $C_{20-24}$ acids and $C_{14-19}$ acids or alcohols and ketones (U.S. Pat. No. 4,659,383). U.S. Pat. No. 4,741,930 discloses a method for color printing by the super-position of semitransparent, solid, optically clear hot melt inks and suggests fatty acids, such as stearic acid and oleic acid, polyethylene, and blends or mixtures of such materials, as base materials for the vehicle.

U.S. Pat. No. 4,684,956 discloses a thermoplastic ink composition comprising blends of synthetic microcrystalline wax and hydrocarbon resin having a viscosity of 3-20 cps at the operating temperature to achieve low viscosity coupled with good adhesion.

None of the prior art, however, provides a hot melt ink containing a nontransparent constituent which is substantially transparent while retaining all of the other properties required for ink jet printing.

SUMMARY OF THE INVENTION

Accordingly, it is an object of the present invention to provide transparent hot melt jet inks that overcome the above-mentioned disadvantages of the prior art.

Another object of the invention is to provide transparent hot melt jet inks which have a desired melt viscosity at jetting temperature and are capable of forming substantially optically clear films on cooling.

These and other objects of the present invention are attained by providing a hot melt ink having a vehicle containing a normally nontransparent material or mixture of materials and including at least one compatible transparentizing material selected from the group consisting of polyol fatty acid esters, polyethylene waxes, synthetic paraffin waxes, microcrystalline and modified microcrystalline waxes and linear alcohols and mixtures thereof. Preferably, the transparentizing material is present in an amount of at least 2 percent by weight and, if desired, it may be present in amounts of 25 percent or more by weight. The nontransparent material or materials included in the vehicle may be present in amounts of 50 percent or more.

The ink compositions of the present invention have the property of film-forming when melted, and they have a tendency to form glasses on cooling, yet have a melt viscosity in the range from 5 centipoise to 100 centipoise in the temperature range from 100° C. to 130° C. and preferably have a viscosity in the range from 10 to 35 centipoise and desirably 15 to 30 centipoise in the temperature range from 115° C. to 125° C. In addition, the compositions of the present invention have a lower heat of fusion than the sum of the heats of fusion of their individual components. They also have substantially uniform density and index of refraction throughout the ink vehicle.

DESCRIPTION OF PREFERRED EMBODIMENTS

The objective of the present invention is to provide a low melt viscosity, transparent, glassy, polymeric hot melt ink vehicle which contains one or more nontransparent substances so that, upon cooling after application, the ink remains substantially transparent so as to project bright and vivid colors when used in an overhead projector, for example.

Most waxes and other materials used as vehicles for hot melt inks crystallize when cooled and the microcrystalline structure renders the ink partially or completely opaque. Such nontransparent ink vehicles include stearic acid, lauric acid, linear polyethylene, aliphatic amide waxes, behenic acid, stearone, aluminum stearate, carnauba wax, microcrystalline waxes, modified microcrystalline waxes, paraffin wax, polyethylene wax, candellila wax, montan wax, hydrogenated castor oil, synthetic ester waxes, oxidized polyethylene waxes, Fischer-Tropsch Waxes, esparto waxes, dammar wax, oxazoline wax, bisamide waxes, amide waxes, oleamides, stearamides, lauramides, erucamide, glycoyl monostearate, glycerol tristearate, chlorinated waxes, cetyl alcohol, laurone, diphenyl phthalate, dicyclohexyl phthalate, camphor, triphenyl phosphate, n-ethyl toluene sulphonamide, and n-cyclohexyl-p toluene sulphonamide.

Many materials suitable for use as vehicles in oil-based printing inks are transparent. For example, the hydrocarbon polymer materials marketed as Escorez and Kristalex, the chlorinated polyolefin marketed as Chloro 70, and the Piccolastic, styrene allyl alcohol and ketone resins, phenolics, alkyds, rosin, rosin esters, polyesters, etc. are examples of transparent materials used in oil based printing inks.

Most of those materials, however, tend to have very high melt viscosities such as several hundred centipoise or more at ink jetting temperatures or are otherwise unsuitable for use in hot melt ink jet printing. Moreover, it would not necessarily be expected that a transparent material, when mixed with a nontransparent material, would provide a transparent mixture—yet whilst retaining the low melt viscosity nature of non-transparent components of the mixture.

In accordance with the invention, however, it has been found that when nontransparent hot melt ink vehicle materials are blended or mixed with selected compatible materials, the combination is transparent upon cooling to the solid state.

The reason for this has not been fully established, but the following are believed to be important factors: The components of the ink vehicle should be substantially compatible throughout the melt-and-freeze cycle; no component of the vehicle should tend to separate on aging; and any crystallization which does occur should be in the form of microcrystals.

Certain waxes or wax-like materials appear to inhibit and interfere with crystal formation in such blends not only by minimizing the size of any crystals, but also by controlling the amount of amorphous intercrystalline materials. An optically clear amorphous material normally has a uniform refractive index and uniform density throughout its bulk. Moreover, an optically clear amorphous polymeric material tends to have a lower heat of fusion than a crystalline or opaque polymeric material of the same general type. Consequently, measurement of the heat of fusion of a polymer can provide an indication of the level of crystallinity in the polymer. E.g., see Blain, R. L., "Application Brief on Thermal Analysis of Polymer Crystallinity TA 12", DuPont Company, Analytical Instruments Division, Wilmington, Del. It is believed that by blending certain waxes and wax-like materials, stable solid solutions of the blends can be formed. Alternatively, the amorphous phases of the additives may act as solvents for the crystalline fractions of the base formulation.

More particularly, the present invention provides a transparent hot melt jet ink that cools to form a substantially optically transparent film by mixing or blending one or more thermoplastics with one or more non-transparent waxes or wax-like viscosity modifying materials such as stearone, laurone, microcrystalline waxes, polyethylene waxes, oxidized polyethylene waxes, polypropylene wax, behenic acid, aliphatic amide wax, etc., plus a second wax or wax-like compound such as polyethylene or linear polyethylene wax, polyol ester of $C_{18-35}$ fatty acids or esters of $C_{18-36}$ acid plus metal soaps, carnauba wax, candellila wax, modified microcrystalline wax, montan wax, paraffin wax, lignite wax, long chain linear alcohols or mixtures thereof. The hot melt jet ink also includes colorants such as dyes, pigments or mixtures of them plus other additives where necessary.

Preferred polyol fatty acid esters for use as transparentizing agents are ethylene glycol esters of $C_{18-35}$ fatty acids and glyceryl esters of $C_{18-36}$ fatty acids with calcium soaps. Preferred polyethylene waxes for use as transparentizing agents are those having a molecular weight of about 400 to 1200. Preferred paraffin waxes are the synthetic paraffin waxes, and preferred linear alcohols are those with a molecular weight of about 500 to 1000.

EXAMPLES 1–3

Hot melt ink samples made using stearic acid, styrene allyl alcohol and glycerol-modified rosin ester were prepared without any transparentizing agent, with a glycol ester of $C_{18-35}$ fatty acid (hereinafter Ester Wax #1), and with a glyceryl ester of $C_{18-36}$ fatty acid plus metallic soaps (hereinafter Ester Wax #2) as transparentizing agents and the transparency of each sample was evaluated after cooling. The compositions in parts by weight and the results of the evaluation are shown in Table I.

TABLE I

| Example | 1 | 2 | 3 |
| --- | --- | --- | --- |
| Stearic acid | 37.0 | 12.5 | 12.5 |
| Styrene allyl alcohol | 6.3 | 6.3 | 6.3 |
| Glycerol-modified rosin ester (Ennesin DHG 100) | 57.0 | 56.3 | 56.3 |
| Ester Wax #1 | — | 25.0 | — |
| Ester Wax #2 | — | — | 25.0 |
| Melt Viscosity @120° C. (cp) | 26 | 19 | 23 |
| Transparency | Poor | Good | Good |

EXAMPLES 4–6

Hot melt ink samples containing stearic acid and chlorinated hydrocarbon wax were prepared without any transparentizer and with differing amounts of both Ester Wax #1 and Ester Wax #2, and the inks were evaluated for transparency after cooling. The compositions in parts by weight and the results of the evaluation are given in Table II.

TABLE II

| Example | 4 | 5 | 6 |
| --- | --- | --- | --- |
| Stearic acid (non-transparent) | 70.0 | 69.3 | 25.0 |
| Chlorinated hydrocarbon wax | 20.0 | 28.0 | 15.0 |
| Ester Wax #1 | — | 17.5 | 15.0 |
| Ester Wax #2 | — | 11.0 | 37.0 |
| Transparency | Poor | Good | Good |
| Melt Viscosity @120° C. (cp) | 30 | 26 | 17 |

EXAMPLES 7–13

Hot melt ink samples containing stearone, oxidized microcrystalline wax and hydrocarbon polymers were prepared without any transparentizer and with varying amounts of polyethylene waxes of molecular weight 500 and molecular weight 1000 and with synthetic paraffin wax, and the inks were evaluated for transparency after cooling, crystallinity and compatibility of components. Transparency was rated on a scale of 0 (completely transparent) to 10 (opaque). Crystallinity was rated on a scale of 0 (no crystals) to 10 (large crystals). The compositions in parts by weight and the results of the evaluation are given in Table III.

TABLE III

| Example | 7 | 8 | 9 | 10 | 11 | 12 | 13 |
| --- | --- | --- | --- | --- | --- | --- | --- |
| Stearone | 39.0 | 39.0 | 39.0 | 39.0 | 39.0 | 39.0 | 39.0 |
| Modified microcrystalline wax | 5.0 | 5.0 | 5.0 | 5.0 | 5.0 | 5.0 | 5.0 |
| Hydrocarbon polymers | 48.5 | 48.5 | 48.5 | 48.5 | 48.5 | 48.5 | 48.5 |
| Polyethylene wax (MW 500) | — | 9.0 | 18.0 | — | — | — | — |
| Polyethylene wax (MW 1000) | — | — | — | — | — | — | 9.0 |
| Synthetic paraffin wax | — | — | — | 4.0 | 9.0 | 18.0 | — |
| Transparency | 10.0 | 2 | 7 | 6 | 3 | 6 | 2 |
| Crystallinity | 10.0 | 2 | NA | 3 | 3 | NA | 2 |
| Compatibility of compo- | Yes | Yes | No | Yes | Yes | No | Yes |

TABLE III-continued

| Example | 7 | 8 | 9 | 10 | 11 | 12 | 13 |
|---|---|---|---|---|---|---|---|
| nents | | | | | | | |
| Melt Viscosity @120° C. (cp) | 29 | 25 | 19 | 25 | 22 | 17 | 27 |

EXAMPLES 14-18

A hot melt ink sample similar to that of Example 7 but with more microcrystalline wax and less hydrocarbon polymer and with about 11 percent polyethylene wax of molecular weight 1000 was prepared and evaluated. In this case, the added polyethylene was insufficient by itself to improve the transparency significantly. With an increased amount of that polyethylene wax and about 2 percent of polyethylene wax of molecular weight 850 or 9 percent of a linear alcohol of molecular weight 700, however, the ink was rendered substantially transparent, whereas 9 percent of linear alcohol of molecular weight 450 was not effective. The ink compositions in parts by weight and the results of the evaluation are shown in Table IV.

TABLE IV

| Example | 14 | 15 | 16 | 17 | 18 |
|---|---|---|---|---|---|
| Stearone | 40.0 | 40.0 | 40.0 | 40.0 | 40.0 |
| Polyethylene wax (MW 1000) | 10.0 | 12.0 | 12.0 | 12.0 | 12.0 |
| Modified microcrystalline wax | 13.0 | 13.0 | 13.0 | 13.0 | 13.0 |
| Hydrocarbon polymers | 26.5 | 26.5 | 26.5 | 26.5 | 26.5 |
| Disperse dyestuff | 2.0 | 2.0 | 2.0 | 2.0 | 2.0 |
| Linear alcohol (MW 700) | — | — | 9.0 | — | — |
| Linear alcohol (MW 450) | — | — | — | 9.0 | — |
| Polyethylene wax (MW 850) | — | — | — | — | 2.0 |
| Transparency | 8 | 2 | 3 | 7 | 1 |
| Melt Viscosity @120° C. (cp) | 30 | 28 | 20 | 22 | 27 |

Although the invention has been described herein with reference to specific embodiments, many modifications and variations therein will readily occur to those skilled in the art. Accordingly, all such variations and modifications are included within the intended scope of the invention.

We claim:

1. A transparent hot melt jet ink having a viscosity in the range from about 5 centipoise to about 100 centipoise in the temperature range from about 100° C. to about 130° C. comprising a coloring agent and thermoplastic vehicle for the coloring agent, a viscosity modifier which is different from the thermoplastic vehicle and which is normally nontransparent when solidified, and a transparentizing agent which is different from the vehicle and the viscosity modifier and is selected from a group consisting of a glycol ester of $C_{18-35}$ fatty acids, glycerol esters of $C_{18-36}$ fatty acids plus metal soaps, polyethylene waxes, synthetic paraffin waxes, long chain linear alcohols, microcrystalline waxes and modified microcrystalline waxes and mixtures thereof wherein the transparentizing agent is present in an amount sufficient to provide a transparent film of reduced crystallinity when the ink is solidified.

2. A transparent hot melt ink according to claim 1 wherein the transparentizing agent comprises an ethylene glycol ester of a $C_{18-35}$ fatty acid.

3. A transparent hot melt ink according to claim 1 wherein the transparentizing agent comprises a glyceryl ester of a $C_{18-36}$ fatty acid.

4. A transparent hot melt ink according to claim 1 wherein the transparentizing agent comprises a synthetic paraffin wax.

5. A transparent hot melt ink according to claim 1 wherein the transparentizing agent comprises a linear alcohol.

6. A transparent hot melt ink according to claim 5 wherein the linear alcohol has a molecular weight in the range from about 500 to about 1000.

7. A transparent hot melt ink according to claim 1 wherein the transparentizing agent comprises a polyethylene wax.

8. A transparent hot melt ink according to claim 7 wherein the polyethylene wax has a molecular weight in the range from about 400 to about 1200.

9. A transparent hot melt ink according to claim 1 wherein the transparentizing agent comprises a microcrystalline wax.

10. A transparent hot melt ink according to claim 1 wherein the transparentizing agent comprises a modified microcrystalline wax.

11. A transparent hot melt ink according to claim 1 wherein the transparentizing agent is present in an amount of from about 2 percent to about 50 percent by weight.

12. A transparent hot melt ink according to claim 1 wherein the transparentizing agent is present in an amount from about 2 percent to about 25 percent by weight.

13. A transparent hot melt ink according to claim 1 having a viscosity in the range from about 10 to about 35 centipoise in the temperature range from about 115° C. to about 125° C.

14. A transparent hot melt ink according to claim 1 having a viscosity in the range from about 15 to about 30 centipoise in the temperature range from about 115° C. to about 125° C.

* * * * *